(12) United States Patent
Calmels et al.

(10) Patent No.: US 7,590,246 B2
(45) Date of Patent: Sep. 15, 2009

(54) AUTHENTICATION BETWEEN A CELLULAR PHONE AND AN ACCESS POINT OF A SHORT-RANGE NETWORK

(75) Inventors: Benoît Calmels, Caen (FR); Christophe Maguy, St Aubin sur Mer (FR); Sébastien Trillaud, Servon sur Vilaine (FR)

(73) Assignee: France Telecom, Paris (FR)

( * ) Notice: Subject to any disclaimer, the term of this patent is extended or adjusted under 35 U.S.C. 154(b) by 693 days.

(21) Appl. No.: 10/996,614

(22) Filed: Nov. 26, 2004

(65) Prior Publication Data

US 2005/0130627 A1    Jun. 16, 2005

(30) Foreign Application Priority Data

Nov. 26, 2003    (EP) .................................. 03292926

(51) Int. Cl.
*H04K 1/00* (2006.01)
*H04M 1/66* (2006.01)
*H04B 5/00* (2006.01)

(52) U.S. Cl. .................... 380/270; 380/248; 380/249; 380/250; 455/411; 455/41.1

(58) Field of Classification Search ......... 380/248–250, 380/270; 455/411, 41
See application file for complete search history.

(56) References Cited

U.S. PATENT DOCUMENTS 5,913,175 A * 6/1999 Pinault ....................... 455/558
6,611,194 B1 * 8/2003 Vieweg et al. ............... 340/5.2
7,158,777 B2 * 1/2007 Lee et al. ..................... 455/411
7,239,864 B2 * 7/2007 Zhang ......................... 455/411
7,248,856 B2 * 7/2007 Wang ........................... 455/411
2002/0031228 A1 * 3/2002 Karkas et al. ................ 380/270
2002/0076054 A1 * 6/2002 Fukutomi et al. ........... 380/277
2002/0126845 A1 * 9/2002 Hue et al. .................... 380/247
2003/0084287 A1 * 5/2003 Wang et al. ................. 713/168
2003/0134642 A1    7/2003 Kostic et al.
2004/0023664 A1 * 2/2004 Mirouze et al. .......... 455/456.1
2004/0077335 A1 * 4/2004 Lee et al. ..................... 455/410
2004/0208151 A1 * 10/2004 Haverinen et al. .......... 370/338

FOREIGN PATENT DOCUMENTS

FR    2 825 869    12/2002
WO    WO 02/07135    1/2002

* cited by examiner

*Primary Examiner*—Kambiz Zand
*Assistant Examiner*—Teshome Hailu
(74) *Attorney, Agent, or Firm*—Lowe Hauptman Ham & Berner, LLP

(57) ABSTRACT

To render secure a connection between an access point of a short-range network and a mobile terminal within a cellular network while precluding acquisition of a PIN code, a platform transmits a confirming message, including a secret code and the access point address retrieved from a terminal request, to the terminal through the cellular network and a connection request message including the secret code and the mobile terminal address to the access point. The access point authenticates the terminal, or the terminals authenticate each other as a function of a session key determined as a function of the secret code retrieved from the connection request message and from the confirming message.

21 Claims, 2 Drawing Sheets

AUTHENTICATION BETWEEN A CELLULAR PHONE AND AN ACCESS POINT OF A SHORT-RANGE NETWORK

RELATED APPLICATIONS

The present application is based on, and claims priority from, EP Application Number 03292926.7, filed Nov. 26, 2003, the disclosure of which is hereby incorporated by reference herein in its entirety.

FIELD OF THE INVENTION

The present invention relates in general to connecting an access point of a short-range wireless network of the Bluetooth or Wi-Fi type to a mobile terminal of a cellular network of the GSM type and equipped with a transceiver module that shall communicate with an access point of the short-range network. More specifically the present invention relates to generating a link key during authentication of the mobile terminal and the access point in order to pair them.

BACKGROUND ART

As regards the security of a radio link, Bluetooth in particular, for instance a user wishing to set up a Bluetooth link between a portable personal computer PC and a cellular mobile terminal will acquire a PIN identification code as the secret key to the computer's and the mobile terminal's keyboards. The computer and the mobile terminal each set up a link key depending on the random numbers being exchanged between them, on the secret key, and on the Bluetooth addresses of the computer and the mobile terminal. Illustratively if the personal computer is the link authenticator, then it will generate a random number (challenge) which it transmits through the Bluetooth radio interface to the mobile terminal. This terminal calculates a response depending on the received random number, on the link key and on the Bluetooth address of the mobile terminal in order that the computer can compare the reply of the terminal with the reply that the computer calculates, whereby, if the compared replies are identical, there is an identity.

The pairing of the computer and the terminal requires a secret key (PIN code) to share the secret link. The secret key must be sufficiently long and not appear in dictionaries to prevent the key from being attacked, in an attempt to discover the key and other coding key(s). Such attacks cast doubt on authentication and on the integrity of the exchanged data.

The secret key must be sufficiently long to preclude such attacks, and consequently a laborious acquisition subject to errors must be carried out, in particular in the mobile terminal having a man-machine interface of limited size.

An object of the present invention is to provide a new and improved method of and apparatus for making a secure connection between a mobile cellular terminal and an access point of a short-range wireless network without having to acquire a secret key (PIN code) while using such a key, which may include many bits.

SUMMARY OF THE INVENTION

According to one aspect of the present invention, an authentication process preceding a session between a short-range radio network having access points and a mobile terminal in a cellular radiocommunication network comprises the following stages:

(1) transmitting a request including a mobile terminal address and an access point address in a zone where the mobile terminal is located; the request is transmitted to a controller that generates a secret code and is linked to the cellular network, (2) transmitting from the controller a confirmation message including the secret code and the access point address that was retrieved from the request by the mobile terminal through the cellular network; the mobile terminal request includes the secret code and the mobile terminal address that was retrieved from the request at the access point, (3) requesting that the mobile terminal be connected to the access point which was designated by the address retrieved from the confirmation message to enable the mobile terminal and the access point to generate a session key depending on (a) the access point address, (b) the mobile terminal address, (c) the secret code that was retrieved from the confirmation message, and (d) the connection request message, and (4) authenticating the mobile terminal on the part of the access point as a function of session key.

Authentication of the mobile terminal preferably includes generating, at the access point, a reply that is a function of the session key and an access point. The reply is transmitted to the mobile terminal which transmitted the reply to the access point through the short-range network. At the access point a reply is generated as a function of the session key and a comparison of the replies for the purpose of authorization opening network. Opening a session between the access point and the mobile terminal is authorized in response to the replies being favorably compared, e.g., the replies being identical.

Preferably the preceding authentication by the access point of the mobile terminal is completed by the mobile terminal authenticating the access point as a function of the session key when the access point has authenticated the mobile terminal. In such a case, following a favorable comparison of the replies of the access point, the procedure preferably transmits a prompt to the mobile terminal. The prompt causes the mobile terminal to authenticate the access point by prompting the access point to generate a second reply as a function of the session key. The access point transmits the second reply to the mobile terminal through the short-range network by generating a second reply as a function of the session key and by comparing the second replies of the mobile terminal and the access point to authorize session opening only in response to a favorable comparison of the second replies compared in the mobile terminal.

It is preferable in practice that the mobile terminal seek several access points in a zone where the mobile terminal is located in order to insert addresses of the access points found in the request. Thereupon a controller selects the address of an optimal access point from among the access point addresses retrieved from the request. The selected address depends on one or more predetermined criteria for enabling the optimal access point to be inserted into a confirming message transmitted to the mobile terminal and into the connection request message transmitted to the optimal access point.

In one embodiment of the present invention, the controller generates the session key instead of the session key being generated by the mobile terminal and the access point. In this variant, the generated session key, instead of the secret code, is inserted into the confirmation message and into the connection request message in order that, during authentication, the replies which are compared are generated as a function of the session key retrieved from the preceding messages.

Another aspect of the present invention relates to a platform type controller linked to a cellular radio communication network for the purpose of taking part in authentication between a short-range wireless network and a mobile terminal within the cellular network. The controller is arranged so the controller replies to a request which includes the mobile terminal address and an access point address in a zone where the mobile terminal is located by generating a secret code. The controller transmits to the mobile terminal a confirming message including the secret code and the access point address that was retrieved from the request. The confirming message is transmitted through the cellular network with a connection request message which includes the secret code and the mobile terminal address retrieved from the request to the access point. The connection request message causes the mobile terminal to request a connection to the access point designated by the address retrieved from the confirming message. The mobile terminal and the access point respond to the connection request message by generating a session key as a function of (1) the access point address, (2) the mobile terminal address and (3) the secret code retrieved from the confirming message. The access point authenticates the mobile terminal as a function of the session key.

In a variation of the present invention, the controller determines the session key and inserts it, instead of the secret code, into the confirming message and the connection request message.

Other features and advantages of the present invention are elucidated in the description below of several preferred, illustrative and non-limiting embodiments of the invention and in relation to the appended drawings.

DETAILED DESCRIPTION OF THE DRAWING

Figure 1:
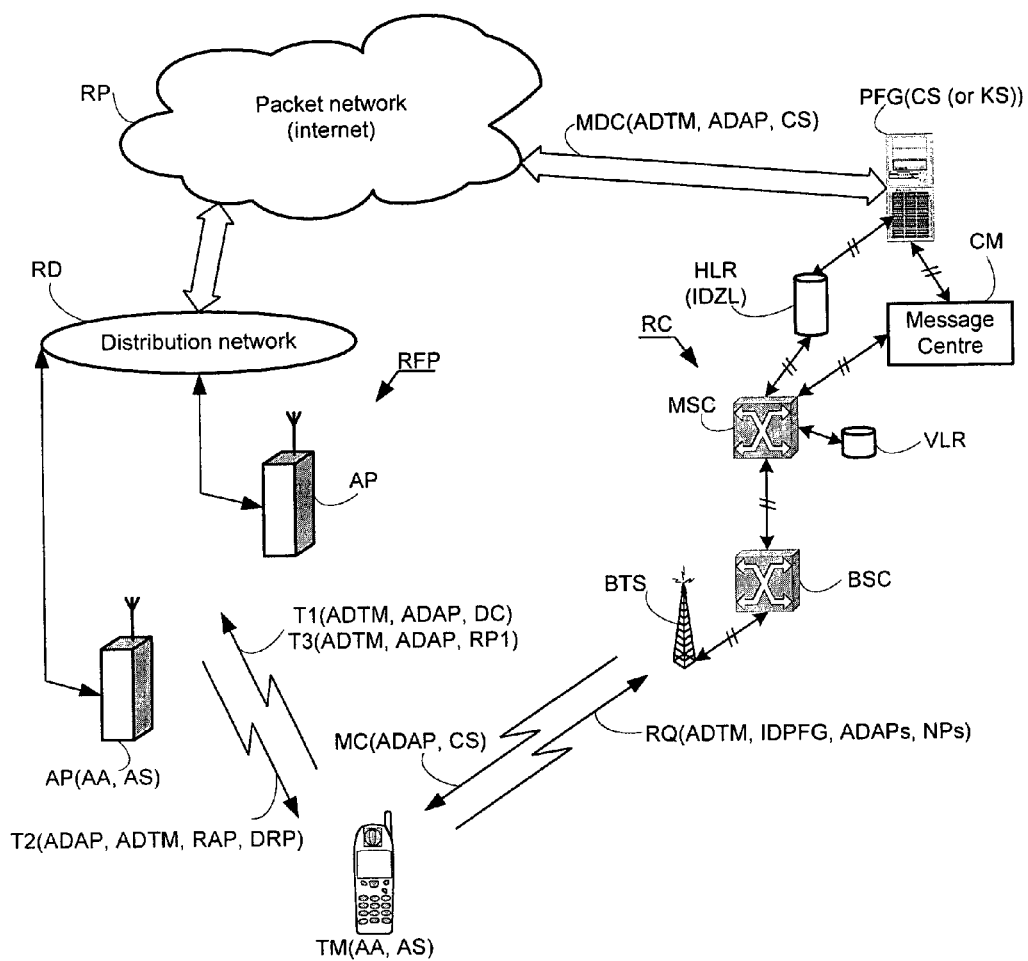
FIG. 1 is a schematic block diagram of a telecommunications system comprising a mobile terminal within a cellular radio communication network and at least one access point in a short-range wireless network used to perform the authentication procedure of a preferred embodiment of this invention.

The telecommunications system shown in FIG. 1 that performs an authentication procedure comprises a cellular mobile terminal TM within a cellular radio communications network RC, one or more access points AP linked by a distribution network RD within a short-range wireless network RFP for accessing a high-rate packet network RP, such as the Internet, and a controller, i.e., management platform, PFG. Illustratively the cellular network RC is a GSM network and the short-range wireless network RFP is a Bluetooth network.

The mobile terminal TM has first and second radio (i.e., wireless) interfaces, respectively with the cellular network RC and the short-range network RFP.

Each of the access points AP and, in a variation, the mobile terminals TM includes a pseudo-random generator and each manages an authentication algorithm AA for producing replies RP1, RP2, etc. Each of the replies RP1, RP2, etc., is a function of a random number, of a secret code and of the address of the mobile terminal or of the address of an access point in the short-range network RFP. A session key algorithm AS also is performed by the stations at the access points and by the mobile terminal.

Mobile terminal TM is temporarily coupled to cellular network RC, for instance a GSM network. Network RC includes, for instance a base station BTS, a base station controller BSC, a mobile switching service MSC associated to a visitor location recorder VLR and a nominal location recorder HLR.

The management platform PFG is linked to the nominal location recorder HLR either directly by an authentication center (not shown) that is linked to the recorder HLR by a server through an intermediary network such as the Internet RP. Also the platform PFG is linked (1) to a Short Message Service Center SMSC in response to short message requests RQ being transmitted to it by mobile terminals and/or (2) to an Unstructured Supplementary Service Data signaling message USSD in response to requests RQ being transmitted to it in USSD form by mobile terminals TM. The USSD messages are transmitted by actual sessions, at a rate greater than the short messages. The short message center and the signaling message center are designated hereafter without distinction as "message center CM". In particular the controller PFG includes a pseudo-random generator that generates secret codes CS in response to requests from mobile terminals such as the terminal TM. The secret codes are longer than usual, typically being at least sixteen octets, namely longer than 128 bits.

In other variations of the system of FIG. 1 invention, the controller PFG contains a database of addresses ADAP of the access points AP of several short-range wireless networks in combination with the geographic locations of the access points AP relative to determined location zones AP relative to determined location zones ZL within the cellular network RC. A location zone within a cellular network covers several cells associated with base stations BTS. A switch MSC manages one or several location zones.

As described infra, controller PFG is an intermediate management tool between a mobile terminal TM and an access point AP. Controller PFG transmits to terminal TM and access point AP a secret code CS used for authentication of the terminal access point. In other variations described farther below, controller PFG selects an optimal access point in reply to request RQ of a mobile terminal.

FIG. 1 only includes one short-range wireless network; it is understood that the mobile terminal TM can communicate with any short-range wireless network, in particular in public places such as a train station, a shopping mall, an airport, a hotel etc. Illustratively a radio access point AP is a station fitted with a Bluetooth radio interface to provide communications within a radius of several dozen meters with mobile terminals and with a line interface. The line interface can communicate on one hand with other access points AP through the distribution network RD if any, of the short-range wireless network. On the other hand the line interface provides high-data rate packet communications at the mobile terminals as a result of the distribution network RD being linked to the Internet RP. In some short-range wireless network configurations, the distribution network RD is an intranet network directly linked by xDSL lines to the Internet RP: alternatively the distribution network RD is merged into the Internet RP and each access point AP is directly linked through xDSL lines to the Internet RP.

Figure 2:
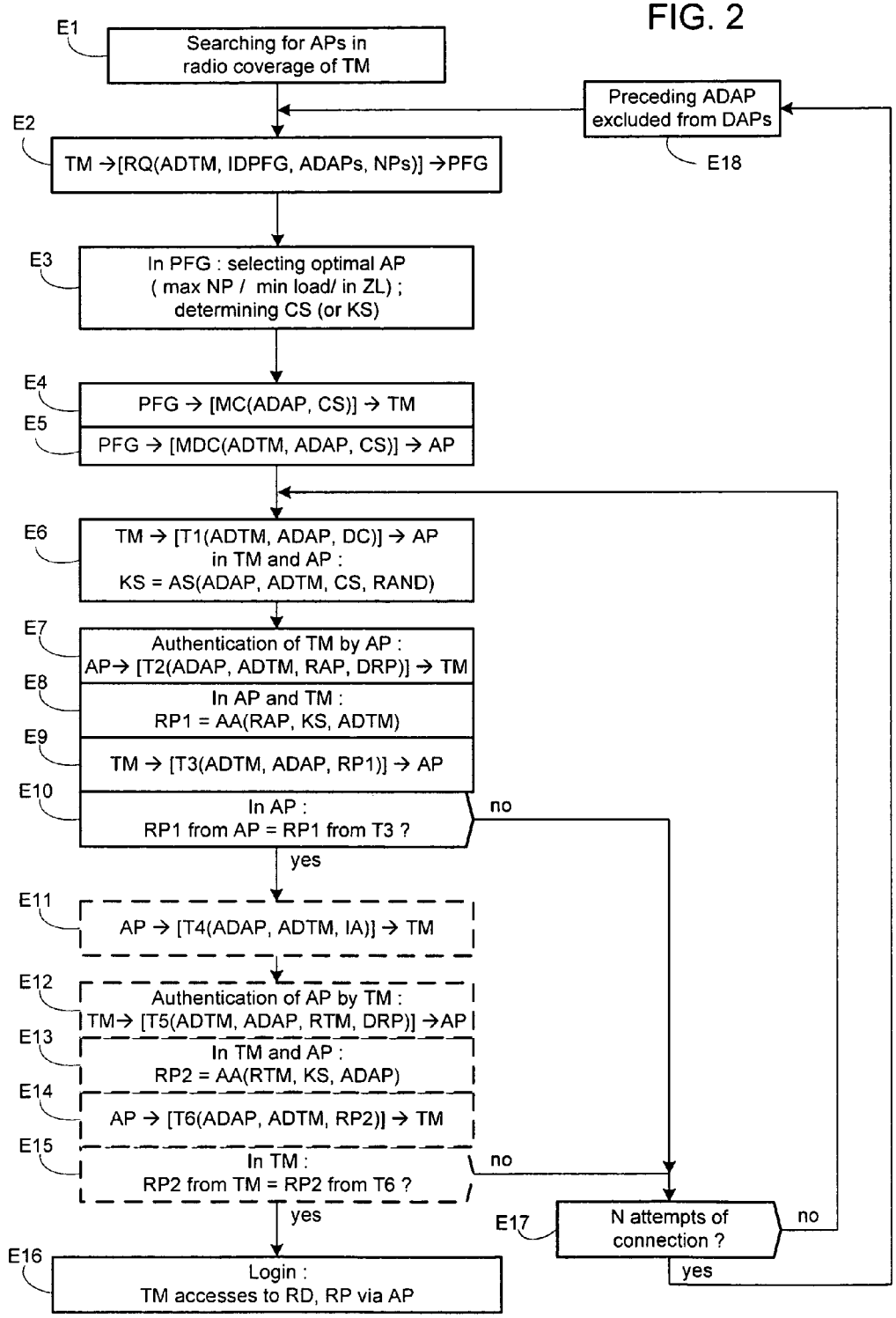
FIG. 2 is a flow diagram of the main steps of an algorithm of the authentication procedure between the mobile terminal and the access point of FIG. 1.

As shown in FIG. 2, the authentication procedure used by the system of FIG. 1 substantially comprises steps or stages E1 through E17. Initially the mobile terminal TM is activated and recognized by the cellular network RC within its radio-electrically covered zone. Accordingly the TM terminal when in the sleep mode is assumed to be located in a zone ZL of the network RC, and has received, in a known manner, a temporary identify TMSI by the recorder VLR coupled to this location zone ZL.

In stage E1, the user of the terminal TM entering the short-range, wireless network RFP with access points AP selects a Bluetooth menu on his terminal TM. The user initiates a search of a sub-menu (inquiry mode) including access points AP. The access points, i.e., stations, AP search for terminals TM in proximity to the access points; that is the access points AP periodically scan for the presence of a mobile terminal and detect an inquiry transmitted by the mobile terminals in the search zone of the access point. Each access point transmits its particular address to the mobile stations in proximity to the access point. By means of this feature the mobile terminal TM collects the addresses ADAP of the access points situated in the zone where the terminal TM is located; the addresses ADAP are collected with respect to the short-range network RFP. The terminal TM sorts the replies to its inquiry for the addresses of the short-range network RFP entities that correspond to equipment classes associated with the access points for the purpose of eliminating any address from any equipment fitted with a transceiver module compatible with the RFP network, such as a mobile phone terminal, a personal digital assistant PDA, a portable computer etc.

In stage E2, the terminal TM stores ADAP addresses of the available access points that were found during the previous search during stage E1. Terminal TM inserts the ADAP addresses into the request RQ that is transmitted to the controller PFG through the fixed portion of the cellular network RC. The request RQ comprises the address ADTM of the terminal TM that was pre-stored in the memory of terminal TM so that the controller PFG can communicate the address of terminal TM to the subsequently selected access points. As the addressee's address, the request RQ includes an identifier, IDPFG, of controller PFG: identifier IDPFG was pre-stored in the mobile terminal TM. The request RQ can be a short message or a signaling message USSD, in which case the controller PFG is then connected to the corresponding message center CM.

In response to the request RQ having been automatically transmitted from the terminal TM and received by controller PFG, the controller then checks the access points list ADAP retrieved from the request RQ to select the optimal access point (stage E3). The selected optimal access point is a function of one of several predetermined criteria. The selection by controller PFG of the optimal access point is preceded by the controller verifying the user profile of the mobile terminal TM, as identified by permanent identifier IMSI of the mobile terminal for the purpose of authorizing access by mobile terminal MT to an access point of the short-range wireless network RFP.

In a first embodiment variation, a predetermined criterion relates to comparing the power levels of reference signals transmitted from the access points and detected by the mobile terminal TM. In this variation the mobile terminal TM also includes, in association with each ADAP address of each available access point that was found in the transmitted request RQ, a power level NP received at the terminal TM. Thereupon the terminal TM transmits to controller PFG the request RQ together with the ADAP address and the NP power level for the access point associated with the ADAP address. Controller PFG compares the received power levels NP to determine the access point having the highest received power level and to select the access point AP associated with the maximum received power level as the optimal access point for the purpose of deciding the access point to be coupled to the terminal TM.

In a somewhat similar embodiment to the above described embodiment, the mobile terminal TM, instead of the controller PFG, searches for, detects and selects the optimal access point having the highest power level received by the mobile terminal. The search is performed during stage E1 from among available access points that were found in the zone where the mobile terminal TM is located. In such an embodiment, the request RQ only contains the address ADAP of the optimal access point AP instead of the pairs ADAP, NP.

In a second embodiment, a predetermined criterion is used to compare traffic loads of the available access points AP that were found by the mobile terminal TM. The criterion enables controller PFG to select the access point having the least traffic as the optimal access point. The traffic loads of the access points AP of the short-range network RFP are collected by the distribution network RD which, through the Internet RP or a special line, periodically communicates the traffic loads to controller PFG to update the access points database.

In a complementary embodiment, which can be combined with the first or second preceding embodiment controller PFG interrogates the nominal location recorder HLR of the cellular network RC to read out the IDZL identifier of the location zone containing the terminal TM within the cellular network. The interrogation occurs before the selection of the optimal access point address takes place. Depending on the location zone identifier IDZL, the controller PFG eliminates the ADFAP addresses of the list included in the request RQ. These ADFAP addresses designate the available and found access points AP that are situated outside the location zone including the mobile terminal TM and defined within the cellular network. This complementary embodiment precludes a mobile terminal from being substituted for the access point by declaring itself to have an address of an access point which is very remote from the mobile terminal in order to communicate with the latter. Next the optimal access point is selected by controller PFG merely taking the first access point address from the list retrieved from the request RQ or by combining this embodiment with the embodiment using the power levels or the traffic loads of the access points in order to select the access point which exhibits the largest power level or the least traffic load among the access points situated in the location zone.

In stage E3 moreover, the pseudo-random generator in controller PFG also determines a secret code CS of great length, at least 128 bits.

Thereupon controller PFG prepares two messages.

In stage E4, controller PFG derives a confirming message MC containing the optimal access point address ADAP and the secret code CS. Controller PFG transmits message MC through the cellular network RC to the mobile terminal TM. The MC message is of the same type as the request RQ, i.e. it is a short message SM or a USSD message, and it propagates through the corresponding message center CM. Terminal TM retrieves and stores the secret code CS from the message MC in association with the optimal access point address ADAP. In stage E4, the terminal TM holds the secret code CS as if, in the prior art, the user had acquired the PIN code at the terminal keyboard.

In parallel with the stage E4, controller PFG sets up a connection request message, MDC, including (1) the address ADTM of the mobile terminal TM, (2) the optimal access point address ADAP and (3) the generated secret code CS to be transmitted to the optimal access point AP in the short-range wireless network (in stage E5). The connection request message MDC is in the form of a packet IP (Internal Protocol) which propagates via the Internet RP to the distribution network RD of the short-range wireless network RFP. The secret code CS retrieved from the MDC message is stored in association with the ADTM address in the station at the optimal access point AP.

In response to the ADAP address of the optimal access point AP retrieved from the confirming message MC received by the mobile terminal TM, terminal TM attempts to connect itself to the thusly identified optimal access point AP by asking the optimal access point to authenticate itself. In stage E6, the mobile terminal TM transmits to optimal access point AP (1) a first frame T1 containing the ADTM terminal address, (2) the ADAP address of the optimal access point, (3) an indicator of connection request and (4) an indicator that the access point is to generate a session key DC.

The optimal access point in the periodic search mode recognizes that the frame T1 is meant for it. The mobile terminal and the access point then each generate a common session key KS by coupling through the short-range network RFP, to the session key algorithm AS, (1) the mobile terminal address ADTM, (2) the access point address ADAP, (3) the secret code CS and (4) one or more mutually exchanged random numbers RAND. The secret code CS used by the mobile terminal is the one retrieved from the confirmation message MC, whereas the secret code CS used by the access point AP is the secret code that is retrieved from the connection request message MDC. The mobile terminal TM and the optimal access point AP are paired in this manner. The session key KS is stored in the terminal and the access point key KS, and is no longer used when the access point AP and the mobile terminal TM are disconnected. Thus, the session key KS is used for authentication and encrypting data only during a transmission session between terminal TM and access point AP.

Next, in response to the first frame T1, authentication of the mobile terminal TM is triggered by the station at optimal access point AP transmitting to the mobile terminal TM, in stage E7, a frame T2. Frame T2 includes the optimal access point address ADAP, the address ADTM of the mobile terminal TM, a random number RAP generated by the pseudo-random generator at the access point and a reply request indicator DRP.

Next the procedure passes through stages E8, E9 and E10 relating to an actual authentication of the mobile terminal TM by the optimal access point AP. In stage E8, upon receiving the frame T2 with the reply request indicator, the mobile terminal TM couples to the authentication algorithm AA the random number RAP retrieved from the frame T2, the session key KS generated in stage E6 and its address ADTM and a reply RP1. In stage E8, the optimal access point AP executes a similar application: RP1=M (RAP, KS, ADTM): however in this instance the session key now is the key that was generated in stage E6 and is associated with the address ADTM. Then, in stage E9, the mobile terminal transmits a frame T3 which includes, (1) the addresses ADTM and ADAP and (2) the reply RP1=AA (RAP, KS, ADTM) that was generated by the mobile terminal. The frame T3 is recognized by the optimal access point AP which, in stage E10, compares (1) the reply RP1 that point AP generated in stage E8 with (2) the reply RPI that point AP retrieved from the received frame T3. If point AP detects that the compared replies are identical, the optimal access point AP authorizes, in stage E16, opening a session through it from the mobile terminal TM toward the distribution network RD and the Internet RP.

This open session key KS is used to generate the session key of an ensuing session between the mobile terminal TM and the access point AP when the session key KS was not erased in the meantime at the end of a time interval which begins with storing the key KS, as predetermined by the operator managing the station at access point AP.

In a more complete embodiment of mutual authentication, when the access point AP has authenticated the mobile terminal TM (in stage E10), the optimal access point AP transmits (in stage E11) a frame T4 containing the ADAP and ADTM addresses and an indicator IA that prompts the terminal TM to authenticate frame T4.

In reply to the preceding frame T4, the mobile terminal TM triggers the authentication of the optimal access point by transmitting a frame T5 (stage E12) to the optimal access point address ADAP. The frame T5 includes a random number RTM generated by the pseudo-random generator at the mobile terminal, and a request reply indicator DRP. In stage E13, the access point AP responds to frame T5 by applying, to authentication algorithm AA, the random number RTM retrieved from the frame T5, the session key KS determined in stage E6 and its address ADAP. The authentication algorithm AA then produces a second reply RP2. Also, in stage E13, the mobile terminal TM executes an operation: RP2=AA (RTM, KS, ADAP). In operation RP2 of stage E13, the session key KS is the session key that was generated in stage E6 and which is associated with the ADAP address. Next, during step 14, the optimal access point AP transmits a frame T6 which includes (1) the ADAP and ADTM addresses, and (2) the reply RP2=AA (RTM, KS, ADAP) that was generated at the optimal access point AP during operation 13. The frame T6 is recognized by the mobile terminal TM which, in stage E15, compares the reply RP2 that was generated in the mobile terminal with the reply RP2 that the mobile terminal retrieved from received frame T6. If the compared replies are favorable, e.g., identical, the terminal TM, by transmitting another frame, confirms the opening of the session requested by the optimal access point in stage E16.

In a further embodiment, the session key KS is not determined separately by the mobile terminal TM and the optimal access point AP in stage E6 but is determined beforehand by controller PFG in stage E3. In the above described manner, the controller PFG randomly generates a session key KS having the same number of bits as the session keys generated by mobile terminal TM and access point AP.

However, to assure coherence, the controller PFG can contain the session key algorithm AS. At the end of stage E3, the controller PFG has selected the optimal access point and has associated the ADAP address of the optimal access point with the address ADTM of the mobile terminal supplying the address that was retrieved from the request RQ. In this embodiment, controller PFG generates the session key by supplying the ADAP and ADTM addresses, the secret code CS and one or more random numbers RAND, to the AS algorithm, in accordance with:

KS=AS(ADAP, ADTM, CS, RAND).

In stages E4 and E5, controller PFG inserts the determined session key KS instead of the secret code CS into the confirming message MC transmitted to the mobile terminal TM and into the connection request message MDC transmitted to the optimal access point AP, to enable the optimal access point and the mobile terminal to use the session key KS for authentication in steps E6 through E10 or steps E6 through E15 and, once the session is open, in stage E16. In this situation, session key KS is not generated in stage E6.

As indicated in stage E17, if authentication of the mobile terminal TM by optimal access point AP fails, that is if the replies RP1 compared in stage E10 differ or if mutual authentication failed, that is, if the replies RP2 compared in stage E15 differ, then a tentative session opening request is repeated by executing the stages E6 through E10 for terminal authentication by the optimal access point AP or by executing E6 through E15 for mutual authentication.

In practice, the stages concerning requests for connection, generating replies and comparing responses, i.e., stages E6 through E10 or stages E6 through E15 can be repeated a maximum of N times as long as the compared replies RP1 or RP2 differ, where N is a predetermined number of iterations, for instance 3.

If, after N-iterated connection requests of stage E17 have been performed and there has been a failure to authenticate, that is, if the compared replies still differ, the procedure automatically returns to stage E2 and stages E3 through E17 are repeated by substituting the ADAP address of another access point selected according to predetermined criteria; an example of such criteria is selecting the ADAP address from the list which is included in the request RQ, as indicated in intermediate stage E18. Obviously the selection of another access point is from this list of the last optimal access point that was previously selected and with respect to which N attempted connections did fail. The other selected optimal access point is situated in the zone where the mobile terminal TM is located regarding the short-range network RFP. It may be that the selected access point is the access point which exhibits the largest received power level or the least traffic load in the remaining list, or that which is subsequent in the list to the last selected optimal access point.

Even though the preferred embodiment of the present invention was discussed above with respect to a cellular network of the GSM type and a short-range wireless network of the Bluetooth type, the invention applies equally to a radio communication network of the UMTS type or more generally to the third generation type and to other short-range wireless networks, such as in the IEEE 802.11B standard and other standards subsequent to the above one, that is to so-called Wi-Fi (Wireless Fidelity) networks. While there have been described and illustrated specific embodiments of the invention, it will be clear that variations in the details of the embodiments specifically illustrated and described may be made without departing from the true spirit and scope of the invention as defined in the appended claims.

The invention claimed is:

1. An authentication method between a short-range wireless network having access points and a mobile terminal within a cellular radio communication network comprising:
   transmitting, from the mobile terminal to a controller through the cellular network, a secret code request including a mobile terminal address and an address of an access point in a zone covered by the mobile terminal,
   generating a secret code in said controller in response to said secret code request,
   transmitting from the controller to the mobile terminal a confirming message including the secret code and the access point address which is retrieved from the secret code request,
   transmitting from the controller to the access point a connection request message including the secret code and the mobile terminal address which is retrieved from the secret code request,
   requesting a connection from the mobile terminal to the access point designated by the address which is retrieved from the confirming message,
   generating a session key as a function of the access point address, the mobile terminal address and the secret code retrieved from the confirming message and from the connection request message, and
   the access point authenticating the mobile terminal as a function of the session key.

2. The method of claim 1 wherein the mobile terminal generates the session key as a function of the access point address, the mobile terminal address and the secret code retrieved from the confirming message, and the access point generates the session key as a function of the access point address, the mobile terminal address and the secret code retrieved from the connection request message.

3. The method of claim 1, wherein authentication of the mobile terminal by the access point comprises requesting a first reply as a function of the session key from the access point to the mobile terminal, and transmitting the first reply from the mobile terminal to the access point through the short-range network, and in said access point generating another first reply as a function of the session key, and authorizing opening a session between the access point and the mobile terminal when said first replies are equal.

4. The method of claim 1, wherein authentication of the access point by the mobile terminal as a function of the session key is in response to the access point authenticating the mobile terminal.

5. The method of claim 4, wherein access point authentication by the mobile terminal comprises transmitting a request from the access point to the mobile terminal, in the transmitted request requesting the mobile terminal to authenticate the access point by asking the access point to generate a second reply as a function of the session key and transmit the second reply to the mobile terminal through the short-range network, generating a second reply as a function of the session key in said mobile terminal, and authorizing opening the session between the access point and the mobile terminal in response to said second replies are equal.

6. The method of claim 1 further comprising repeating the connection requesting steps at most a predetermined number of times until the authentication is successful.

7. The method of claim 1 further comprising repeating the transmitting, secret code generating, confirming message transmitting, connection request message transmitting, connection requesting, session key generating and authenticating steps for another access point in the zone covered by the mobile terminal.

8. The method of claim 7 further comprising repeating the connection request steps at most a predetermined number of times until the authentication is successful.

9. The method of claim 1 further comprising, in the mobile terminal, searching for the access point having the highest power level received by the mobile terminal among the access points of the zone covered by the mobile terminal, designating as the optimal access point the access point having the highest power level, and causing said mobile terminal to insert the address of the optimal access point into the secret code request.

10. The method of claim 1 further comprising
   in the mobile terminal, searching access points in the zone covered by the mobile terminal, and inserting addresses of the found access points into the secret code request, and
   in the controller selecting the address of an optimal access point from among the found access point addresses retrieved from the secret code request according to a predetermined criterion, and inserting the optimal access point address into the confirming message transmitted to the mobile terminal and into the connection request message transmitted to the optimal access point.

11. The method of claim 10 wherein the predetermined criterion relates to comparing power levels of the found access points received by the mobile terminal and transmitted jointly with the addresses of the found access points in the secret code request, and causing the controller to designate the access point having the highest received power level as the optimal access point.

12. The method of claim 10 wherein the predetermined criterion relates to comparing the traffic loads of the access points found by the mobile terminal, and causing the controller to select as the optimal access point the access point exhibiting the least traffic load.

13. The method of claim 10 wherein the predetermined criterion also relates to eliminating one of the addresses of the found access points that are situated outside a zone including the mobile terminal and defined within the cellular network before the address of the optimal access point is selected.

14. The method of claim 1 wherein the secret code generated by the controller is generated in a pseudo-random manner, the code having a length larger than 16 octets.

15. The method of claim 1 further comprising causing the controller to generate the session key instead of the session key being generated in the mobile terminal and at the access point, and inserting the generated session key instead of the secret code in the confirming message and in the connection request message.

16. A controller linked to a cellular radio communication network adapted to participate in authenticating a link between a short-range wireless network and a mobile terminal in the cellular network, the controller being arranged to reply to a secret code request transmitted from the mobile terminal and including the address of the mobile terminal and the address of an access point in the zone covered by the mobile terminal, by generating a secret code in response to said secret code request and transmitting (a) a confirming message including the secret code and the access point address retrieved from the secret code request to the mobile terminal through the cellular network and (b) a connection request message including the secret code and the mobile terminal address retrieved from the secret code request to the access point so the mobile terminal can ask for an authentication to the access point designated by the address retrieved from the confirming message as a function of a session key which is determined as a function of the secret code retrieved from the connection request message and from the confirming message.

17. The controller of claim 16 in combination with the mobile terminal and the access point, the mobile terminal and the access point being arranged to generate the session key respectively (a) as a function of the access point address, the mobile terminals address, and the secret code retrieved from the confirming message, and (b) as a function of the access point address, the mobile terminal address and the secret code retrieved from the connection request message, the access point being arranged to authenticate the mobile terminal as a function of the session key.

18. The combination of claim 17 wherein the controller is arranged to generate the session key and insert it, instead of the secret code, into the confirming message and into the connection request message.

19. A method of securing a connection between an access point of a short-range network and a mobile terminal within a cellular network while precluding acquisition of a PIN code, comprising transmitting (a) a confirming message including a secret code and the access point address retrieved from a terminal request to the terminal through the cellular network and (b) a connection request message including the secret code and the mobile terminal address to the access point causing the access point to authenticate the terminal as a function of a session key determined as a function of the secret code retrieved from the connection request message and from the confirming message.

20. A system including the access point, short range network, mobile terminal and cellular network of claim 18 for performing the method of claim 19.

21. The method of claim 1 wherein the step of transmitting from the controller to the mobile terminal is via a direct communication between them.

* * * * *